United States Patent
Yang (10) Patent No.: US 8,644,788 B2
(45) Date of Patent: Feb. 4, 2014

(54) SIGNAL RECEIVER, PORTABLE COMPUTER AND SIGNAL ACQUISITION METHOD USED IN SATELLITE COMMUNICATION SYSTEM

(75) Inventor: Hung-Yi Yang, Hsinchu (TW)

(73) Assignee: Skytraq Technology, Inc., Hsinchu (TW)

( * ) Notice: Subject to any disclaimer, the term of this patent is extended or adjusted under 35 U.S.C. 154(b) by 64 days.

(21) Appl. No.: 13/461,806

(22) Filed: May 2, 2012

(65) Prior Publication Data

US 2013/0295871 A1 Nov. 7, 2013

(51) Int. Cl.
*H04B 1/16* (2006.01)
*H04B 1/28* (2006.01)
*H04B 1/30* (2006.01)

(52) U.S. Cl.
CPC ... *H04B 1/28* (2013.01); *H04B 1/30* (2013.01)
USPC ....... 455/334; 455/456.1; 455/12.1; 455/266; 375/140; 375/130; 375/147

(58) Field of Classification Search
CPC ........................................................ H04B 1/28
USPC .............. 455/334, 456.1, 12.1, 266; 375/140, 375/130, 147
See application file for complete search history.

(56) References Cited

U.S. PATENT DOCUMENTS

| | | |
|---|---|---|
| 6,845,124 B2 | 1/2005 | Mattos et al. |
| 6,922,167 B2 | 7/2005 | Gerein |
| 7,065,127 B2 * | 6/2006 | Keller et al. .................. 375/140 |
| 7,298,780 B2 | 11/2007 | Zhengdi et al. |
| 7,301,377 B2 | 11/2007 | Tanaka et al. |
| 7,471,241 B1 | 12/2008 | Yang |
| 7,474,261 B2 | 1/2009 | Young |
| 7,561,638 B2 | 7/2009 | Tanaka et al. |
| 7,702,002 B2 | 4/2010 | Krasner |
| 7,743,177 B2 | 6/2010 | Jia et al. |
| 7,830,950 B2 | 11/2010 | Valio et al. |
| 7,860,145 B2 | 12/2010 | Knight et al. |
| 7,932,856 B2 | 4/2011 | Baba |
| 7,932,859 B2 | 4/2011 | Baddini Mantovani |
| 7,940,212 B2 | 5/2011 | Ammann |
| 7,994,977 B2 | 8/2011 | Lennen |
| 8,000,378 B2 | 8/2011 | Mo et al. |
| 8,035,555 B2 | 10/2011 | Winkel |
| 8,059,698 B2 | 11/2011 | Mester et al. |
| 8,059,700 B2 | 11/2011 | Lopez-Risueno et al. |
| 2003/0219082 A1 | 11/2003 | Tanaka et al. |
| 2004/0119618 A1 | 6/2004 | Mattos et al. |

(Continued)

*Primary Examiner* — Sanh Phu
(74) *Attorney, Agent, or Firm* — Che-Yang Chen; Law Office of Michael Chen (57) ABSTRACT

A signal receiver used in a satellite communication system is provided. The signal receiver comprises a first type code generator, a second type code generator, a composite code generator, a correlation module and a determining module. The first type code generator generates a first type code corresponding to a first type signal. The second type code generator generates a second type code corresponding to a second type signal and having a code length N-time longer than that of the first type code. The composite code generator generates a composite code by superimposing N successive first type codes on the second type code. The correlation module correlates the composite code with a cell of a received signal to generate correlation results. The determining module determines a type of the received signal according to correlation results of the composite code with the received signal.

20 Claims, 4 Drawing Sheets

(56) References Cited

U.S. PATENT DOCUMENTS

| | | |
|---|---|---|
| 2005/0012664 A1 | 1/2005 | Gerein |
| 2005/0080561 A1 | 4/2005 | Abraham et al. |
| 2005/0129096 A1 | 6/2005 | Zhengdi et al. |
| 2005/0163201 A1 | 7/2005 | Krasner |
| 2007/0090994 A1 | 4/2007 | Young |
| 2007/0116098 A1 | 5/2007 | Valio et al. |
| 2007/0258511 A1 | 11/2007 | Knight et al. |
| 2007/0274374 A1 | 11/2007 | Abraham |
| 2008/0232441 A1 | 9/2008 | Mester et al. |
| 2008/0246655 A1 | 10/2008 | Winkel |
| 2008/0246659 A1 | 10/2008 | Brenner |
| 2008/0260001 A1 | 10/2008 | Betz et al. |
| 2008/0273578 A1 | 11/2008 | Brenner et al. |
| 2009/0002227 A1 | 1/2009 | Jia et al. |
| 2009/0041089 A1 | 2/2009 | Jhang et al. |
| 2009/0153399 A1 | 6/2009 | Abraham et al. |
| 2009/0168851 A1 | 7/2009 | Wang et al. |
| 2009/0196329 A1 | 8/2009 | Legate et al. |
| 2009/0213906 A1 | 8/2009 | Schmid |
| 2009/0258657 A1 | 10/2009 | Tanaka et al. |
| 2009/0289846 A1 | 11/2009 | Ammann |
| 2009/0289849 A1 | 11/2009 | Baddini Mantovani |
| 2010/0074308 A1 | 3/2010 | Young |
| 2010/0124255 A1 | 5/2010 | Riley |
| 2010/0134354 A1 | 6/2010 | Lennen |
| 2010/0135364 A1 | 6/2010 | Hodgart |
| 2010/0142593 A1 | 6/2010 | Schmid |
| 2010/0189163 A1 | 7/2010 | Burgi et al. |
| 2010/0195773 A1 | 8/2010 | Young |
| 2010/0214165 A1 | 8/2010 | Baba |
| 2010/0254438 A1 | 10/2010 | Liu et al. |
| 2010/0284440 A1 | 11/2010 | Betz et al. |
| 2010/0328152 A1 | 12/2010 | Abraham et al. |
| 2011/0007782 A1 | 1/2011 | Takahashi et al. |
| 2011/0032920 A1 | 2/2011 | Suberviola |
| 2011/0068958 A1 | 3/2011 | Knight et al. |
| 2011/0096719 A1 | 4/2011 | Burgio |
| 2011/0103432 A1 | 5/2011 | Tangudu et al. |
| 2011/0103433 A1 | 5/2011 | Krasner |
| 2011/0125460 A1 | 5/2011 | Suzuki |
| 2011/0129002 A1 | 6/2011 | De Latour |
| 2011/0193745 A1 | 8/2011 | Ammann |
| 2011/0206092 A1 | 8/2011 | Mizuochi et al. |
| 2011/0206093 A1 | 8/2011 | Mizuochi et al. |
| 2011/0235687 A1 | 9/2011 | Mizuochi |
| 2011/0261805 A1 | 10/2011 | Landry, Jr. et al. |
| 2011/0279318 A1 | 11/2011 | Lennen |
| 2011/0312334 A1 | 12/2011 | Yajima |

\* cited by examiner

SIGNAL RECEIVER, PORTABLE COMPUTER AND SIGNAL ACQUISITION METHOD USED IN SATELLITE COMMUNICATION SYSTEM

BACKGROUND

1. Technical Field

The present disclosure relates to a satellite communication technology. More particularly, the present disclosure relates to a signal receiver and a signal acquisition method used in a satellite communication system.

2. Description of Related Art

A satellite positioning system (SPS) is a system of satellites that provide autonomous geo-spatial positioning with global coverage. It allows small electronic receivers to determine their location (longitude, latitude, and altitude) to within a few meters using time signals transmitted along a line-of-sight by radio from satellites. Receivers calculate the precise time as well as position, which can be used as a reference for scientific experiments.

Such a SPS satellite typically transmits a signal marked with a repeating pseudo-random noise (PN) code of a set number of chips. For example, a satellite in a constellation of a Global Navigation Satellite System (GNSS) such as GPS or Galileo may transmit a signal marked with a PN code that is distinguishable from PN codes transmitted by other satellites in the constellation.

However, satellite signal receivers are generally designed to receive signals from satellites in one satellite system, e.g. the GPS or Galileo, but not both. Due to the signal differences, receivers of GPS and Galileo signals are not compatible, which is inconvenient. Thus, there is a need for an improved, satellite signal receiver that acquires signals from satellites in multiple satellite systems using common correlator circuits.

SUMMARY

An aspect of the present disclosure is to provide a signal receiver used in a satellite communication system. The signal receiver comprises a first type code generator, a second type code generator, a composite code generator, a correlation module and a determining module. The first type code generator generates a first type code corresponding to a first type signal. The second type code generator generates a second type code corresponding to a second type signal and having a code length N-time longer than that of the first type code. The composite code generator generates a composite code by superimposing N successive first type codes on the second type code. The correlation module correlates the composite code with a cell of a received signal to generate correlation results. The determining module determines a type of the received signal according to correlation results of the composite code with the received signal.

Another aspect of the present disclosure is to provide a signal acquisition method used in a satellite communication system. The signal acquisition method comprises the steps outlined below. A first type code corresponding to a first type signal is generated. A second type code corresponding to a second type signal and having a code length N-time longer than that of the first type code is generated. A composite code is generated by superimposing N successive first type codes on the second type code. The composite code is correlated with a cell of a received signal to generate correlation results. A type of the received signal is determined according to correlation results of the composite code with the received signal.

Yet another aspect of the present disclosure is to provide a portable computer used in a wireless communication system. The portable computer comprises an antenna and a communication module. The antenna receives a received signal. The communication module comprises a first type code generator, a second type code generator, a composite code generator, a correlation module and a determining module. The first type code generator In generates a first type code corresponding to a first type signal. The second type code generator generates a second type code corresponding to a second type signal and having a code length N-time longer than that of the first type code. The composite code generator generates a composite code by superimposing N successive first type codes on the second type code. The correlation module correlates the composite code with a cell of a received signal to generate correlation results. The determining module determines a type of the received signal according to correlation results of the composite code with the received signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by the following detailed description of the embodiment, with reference made to the accompanying drawings as follows.

DETAILED DESCRIPTION

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It is also to be understood that the terminology used herein is for the purpose of describing particular embodiments of this disclosure only and is not intended to be limiting.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
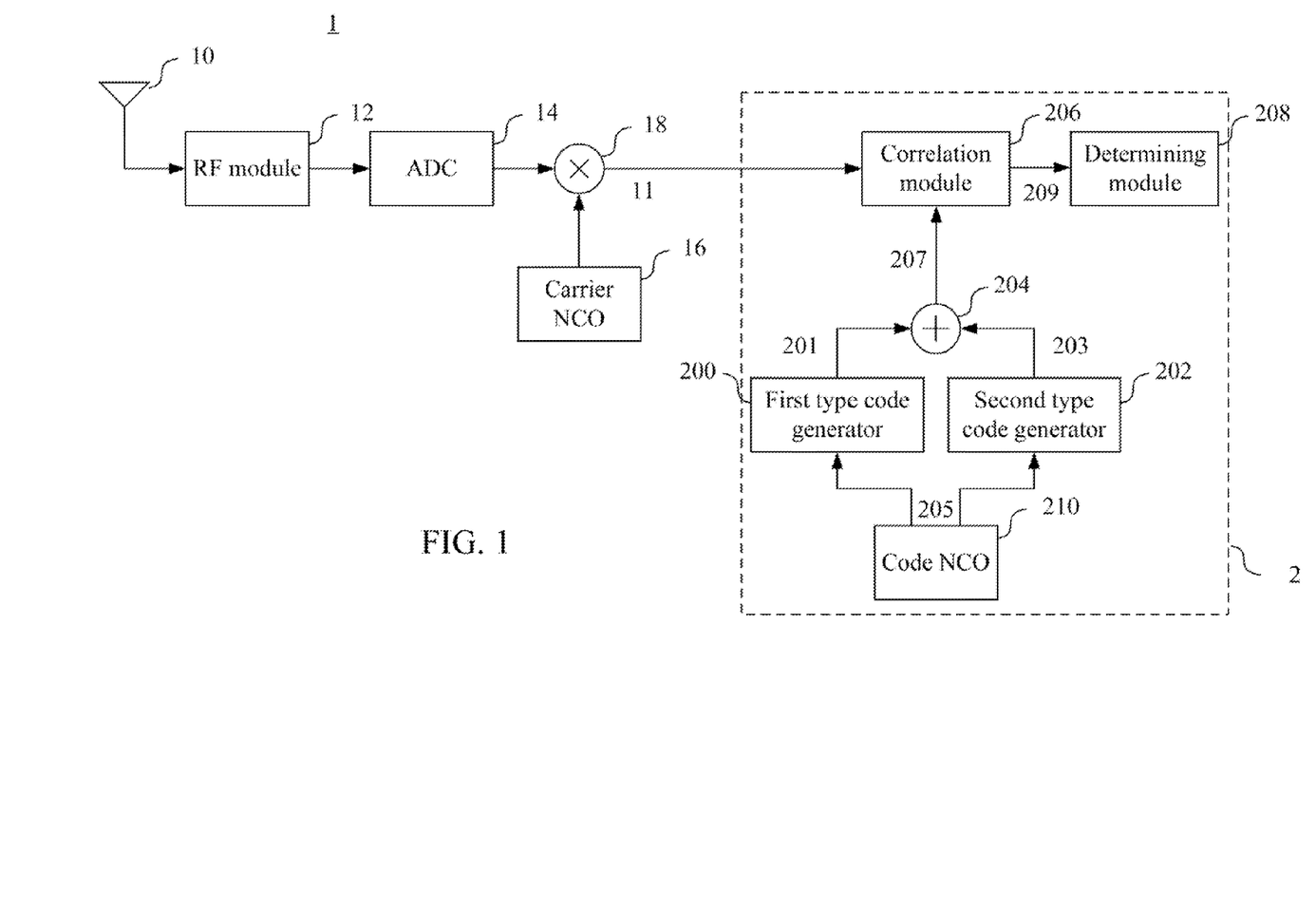
FIG. 1 is a block diagram schematically showing a receiver system used in a satellite communication system in an embodiment of the present disclosure.

FIG. 1 is a block diagram schematically showing a receiver system 1 used in a wireless communication system in an embodiment of the present disclosure. In an embodiment, the wireless communication system is a satellite communication system. The receiver system 1 has an RF (radio frequency) module 12, an ADC (analog-to-digital converter) 14, a carrier NCO (numerical control oscillator) 16, a mixer module 18 and a signal receiver 2. In an embodiment, the receiver system 1 can be used in a portable computer (not shown) and be integrated in a communication module (not shown) of the portable computer. In other embodiments, the receiver system 1 can be used in other computer system as well.

The RF module 12 can performs RF relevant operations to a received wireless signal received from an antenna 10 as widely known in this field, in which the antenna 10 can be a part of the receiver system 1 or be disposed in the portable computer independently in different embodiments. In an embodiment, the wireless signal is a satellite signal when the wireless communication system is a satellite communication system. The ADC 14 converts the received satellite signal from an analog form to a digital form. The carrier NCO 16 provides an IF carrier such that the mixer module 18 mixes the IF carrier with the received satellite signal to generate a received signal 11 that is in a baseband frequency range. The signal receiver 2 performs correlation on the received signal 11 with a code. The details will be further described.

The signal receiver 2 has a first type code generator 200, a second type code generator 202, a composite code generator 204, a correlation module 206 and a determining module 208.

The first type code generator 200 generates a first type code 201. The second type code generator 202 generates a second type code 203 having a code length N-time (e.g. N is an integer) longer than that of the first type code. In an embodiment, the signal receiver 2 further includes a code NCO connected to both the first type code generator 200 and the second type code generator 202 for providing a local oscillation signal 205 having a specific frequency such that the first and the second type code generators 200 and 202 can generate the first and the second type codes 201 and 203 according to the specific frequency. In an embodiment, the first type code 201 corresponds to a GPS signal and the second type code 203 corresponds to a Galileo signal, in which the GPS code has a code length of 1023 chips, i.e. 1 ms and the Galileo code has a code length of 4092 chips, i.e. 4 ms.

Figure 2:
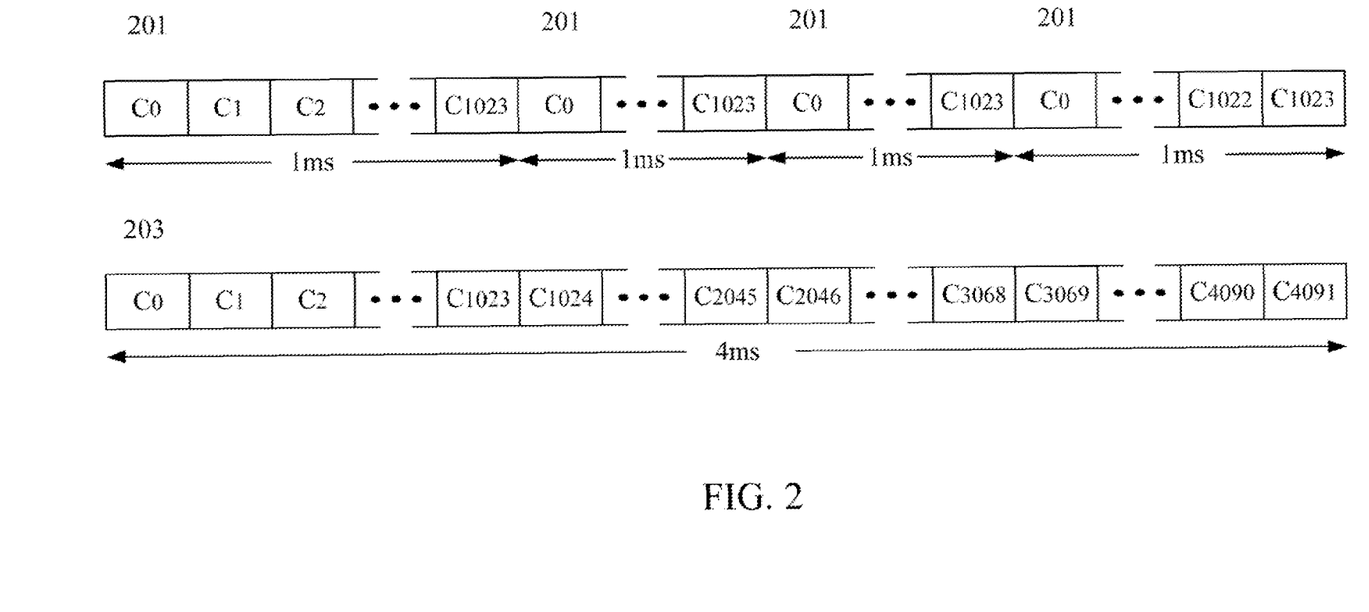
FIG. 2 is a schematic illustration showing four successive first type codes and the second type code in an embodiment of the present disclosure.

The composite code generator 204 generates a composite code 207 by superimposing N successive first type codes 201 on the second type code 203. Please refer to FIG. 2 at the same time. FIG. 2 is a schematic illustration showing four successive first type codes 201 and the second type code 203 in an embodiment of the present disclosure. As described above, when the first type code 201 is a GPS code and the second type code 203 is a Galileo code, the code length of the first type code 201 and the second type code 203 are 1 ms and 4 ms respectively.

Hence, by duplicating the first type codes 201 and combining them in a successive manner, a plurality of successive first type codes 201 with 4 ms code length can be generated. By adding the four successive first type codes 201 and the second type code 203 in a signed manner, the composite code 207 can thus be generated. In an embodiment, the composite code generator 204 superimposes the successive first type codes 201 on the second type code 203 with an equal gain in a signed manner. In other embodiments, the composite code generator 204 can also superimpose the successive first type codes 201 on the second type code 203 with different gain in a signed manner when the signal strength of the first type signal and the second type signal is different. It is also noted that in an embodiment, the term "superimpose" means that the two codes are added in a signed manner. Hence the signal strength of the superimposed result of the two codes may not be necessarily increased and may be decreased due to the cancellation.

It is noted that in other embodiments, the composite code generator 204 can further superimpose the code from a third type code generator (not shown) and is not limited by superimposing the codes from merely the first type code generator 200 and the second type code generator 202.

The correlation module 206 further correlates the composite code 207 with a cell of the received signal 11 from the mixer module 18 to generate correlation results 209, in which one cell of the received signal 11 represents a section of the received signal 11. The determining module 208 then determines a type of the received signal 11. Once the composite code 207 matches the received signal 11, at least one peak will be found in the correlation results 209.

In an embodiment, when N repetitive and evenly spaced peaks (N=4 and space=1023 in the present embodiment) are found in the correlation results 209, the determining module 208 determines that the received signal 11 is the first type signal, i.e. the GPS signal. It is noted that the height of the peaks may be slightly different, but basically these peaks are similar to each other. It is also noted that the term "repetitive peaks" means that the interval between each two successive peaks are the same. In the present embodiment, when the received signal 11 is a GPS signal, the interval between each two successive peaks has a fixed length of 1023 chips. On the other hand, when a single peak is found in the correlation results 209, the determining module 208 determines that the received signal 11 is a second type signal, i.e. the Galileo signal.

In another embodiment, when N repetitive peaks are found in the correlation results and when a height of one of the N repetitive peaks is larger than the height of the others, the type of the received signal is determined to comprise the first type signal and the second type signal. In such a condition, the peak generated according to the second type signal is superimposed on one of the N repetitive peaks generated according to the first type signal in a positive manner and is observed to be higher than the others.

In yet another embodiment, when N+1 peaks are found in the correlation results, the type of the received signal is determined to comprise the first type signal and the second type signal. In such a condition, the peak generated according to the second type signal is separated from the N repetitive peaks generated according to the first type signal.

In further another embodiment, when N−1 peaks are found in the correlation results, the type of the received signal is determined to comprise the first type signal and the second type signal. In such a condition, the peak generated according to the second type signal is superimposed on one of the N repetitive peaks generated according to the first type signal in a negative manner and is observed to be lower than the others. Hence, only N−1 peaks are found in the correlation results.

In order to verify the type of the received signal 11, the determining module 208 further accumulates the correlation results 209 generated from a plurality of successive cells of the received signal 11 in an embodiment of the present disclosure. In other words, the correlation results 209 are accumulated such that each of the peaks in the correlation results 209 appears more clearly to help the determining module 208 confirm that the peak is not generated by noise and is a true peak.

In an embodiment, when both of the first type signal and the second type signal are not found, the system can either make the first type code generator 200 and the second type code generator 202 change a code pattern code or make the code NCO 210 modify the specific frequency to initialize a new code generation and correlation process.

Consequently, the signal receiver 2 of the present disclosure can superimpose at least two types of codes to perform correlation on the received signal to search at least two different kinds of satellite signals efficiently. In an embodiment, the second type code 203 can also be generated by shifting and combining a plurality of section codes of an original full code. For example, by dividing an original full code of a code length of 4 ms into two section codes each having a code length of 2 ms and combining them together, a cyclic shifted-and-combined code of a code length of 2 ms is generated. After folding the original full code to generate the second type code 203, the first type code 201 can be duplicated once to form successive first type codes 201 with a length of 2 ms. The successive first type codes 201 can be further superimposed on the second type code 203 to form the composite code such that the composite code is correlated to the received signal 11. However, in such a case, when only one peak is found corresponding to the second type code 203, it takes time to verify the true peak since there is ambiguity of the searched peak. The verification process is not in the scope of the present disclosure, thus no further detail is discussed herein.

Figure 3:
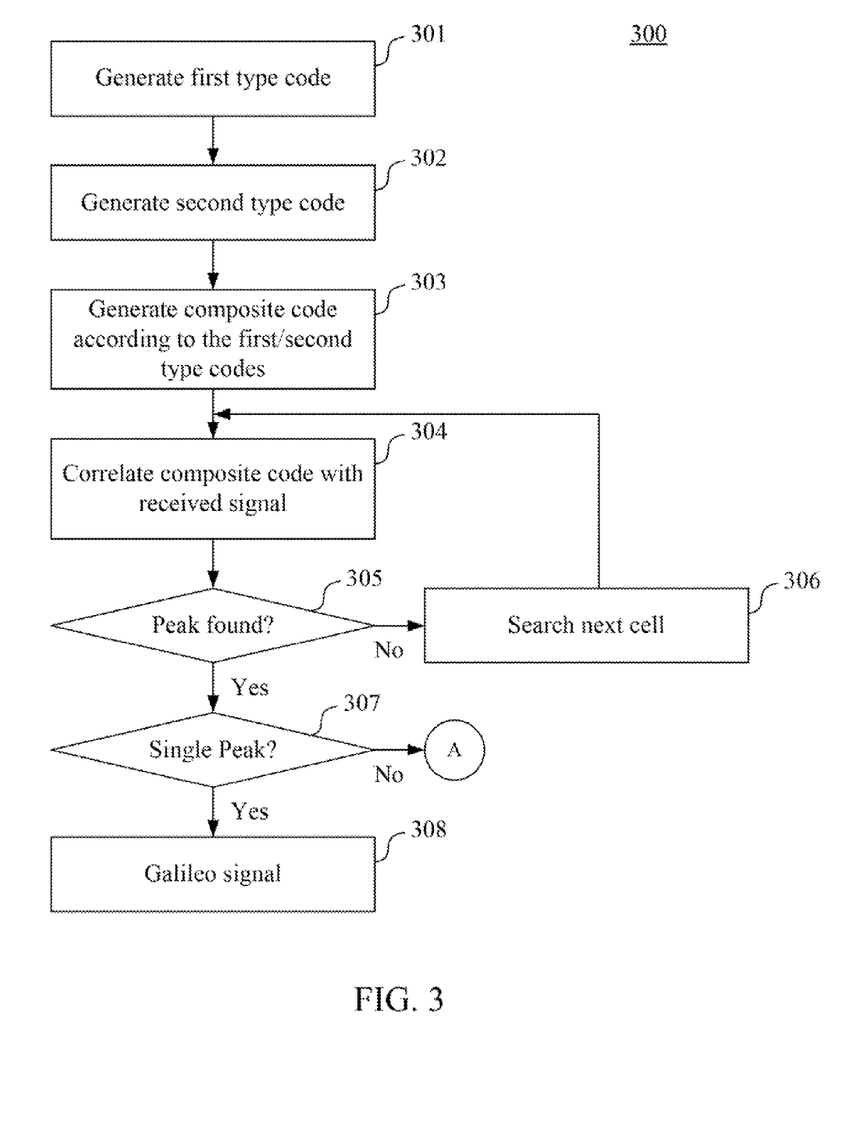
FIG. 3 and FIG. 4 are flow charts of a signal acquisition method used in a satellite communication system in an embodiment of the present disclosure.
Figure 4:
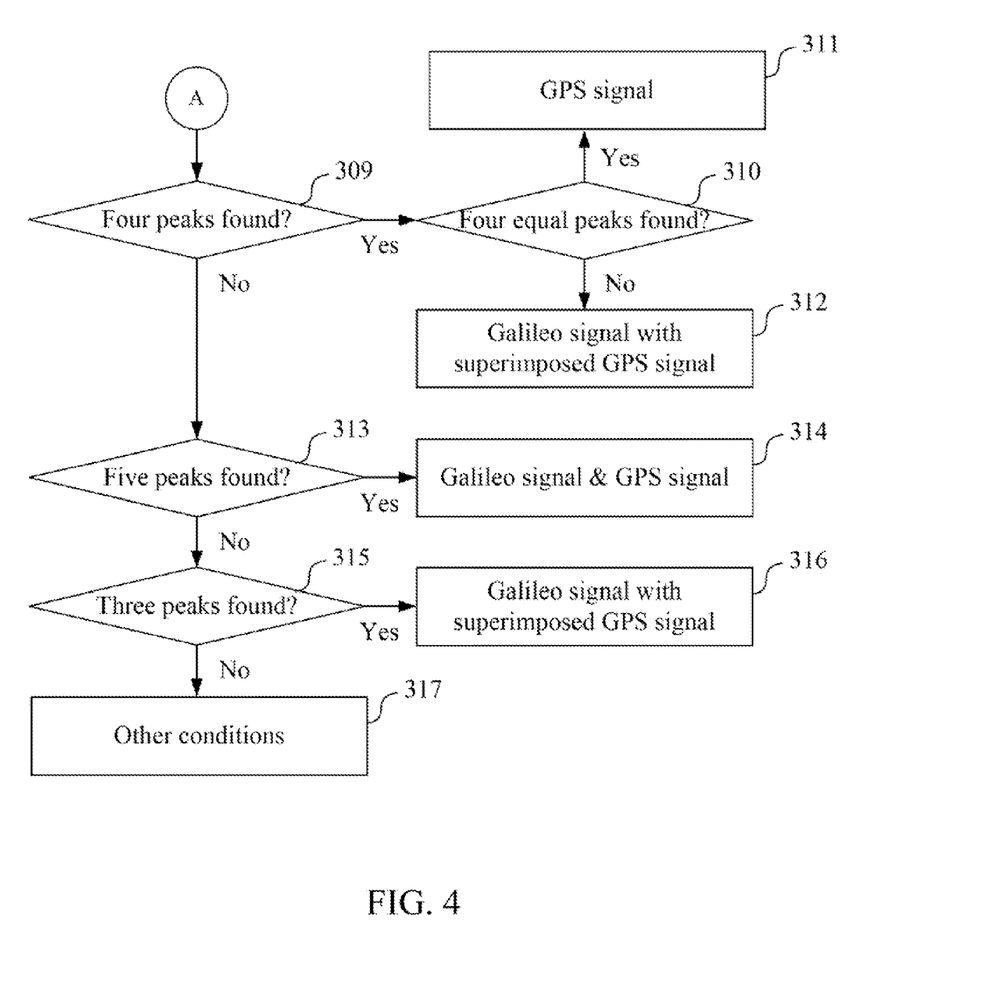

FIG. 3 and FIG. 4 are flow charts of a signal acquisition method 300 used in a satellite communication system in an embodiment of the present disclosure. The signal acquisition method 300 can be used in the signal receiver 2 depicted in FIG. 1. The signal acquisition method 300 comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the first type code generator 200 generates a first type code 201 corresponding to a first type signal (i.e. a GPS signal). In step 302, the second type code generator 202 generates a second type code 203 corresponding to a second type signal (i.e. a Galileo signal) and having a code length N-time longer than that of the first type code 201. In step 303, the composite code generator 204 generates a composite code 207 by superimposing N successive first type codes 201 on the second type code 203.

In step 304, the correlation module 206 correlates the composite code 207 with a received signal 11 to generate correlation results 209. In step 305, the determining module 208 determines whether a peak is found. When the peak is not found, the next cell of the signal is searched in step 306, in which the specific frequency provided by the code NCO 210 or the code pattern may be changed.

When the peak is found, the determining module 208 determines whether a single peak is found in the correlation results 209 in step 307. When a single peak is found in the correlation results 209, the determining module 208 determines that the received signal 11 is a second type signal, which is the Galileo signal in the present embodiment in step 308.

When more than one peaks are found in the correlation results, the signal acquisition method 300 goes to point A and continues further to the flow depicted in FIG. 4. In step 309, the determining module 208 determines whether there are four peaks found in the correlation results 209. When there are four peaks found in the correlation results 209, the determining module 208 further determines whether the four peaks found in the correlation results 209 are equal in step 310. It is noted that the term "equal" does not mean that the four peaks are necessarily precisely the same. In other words, the four peaks can be roughly equal within a tolerable range. When the four peaks are equal, the determining module 208 determines that the received signal 11 is a first type signal, which is the GPS signal in the present embodiment in step 311. When there are four peaks found in the correlation results 209 and the height of one of the four repetitive peaks is larger than the height of the others, the determining module 208 determines that the type of the received signal comprises the first type signal and the second type signal in step 312, in which in such a condition, the peak generated according to the second type signal is superimposed on one of the N repetitive peaks generated according to the first type signal in a positive manner and is observed to be higher than the others.

On the other hand, when there are not four peaks found in the correlation results 209, the flow further continues to step 313 to determine whether there are five peaks found in the correlation results 209. When there are five peaks found in the correlation results 209, the determining module 208 determines that the received signal 11 comprises the first type signal and the second type signal in step 314, in which in such a condition, the peak generated according to the second type signal is separated from the four repetitive peaks generated according to the first type signal.

When there are not five peaks found in the correlation results 209, the flow further continues to step 315 to determine whether there are three peaks found in the correlation results 209. When there are three peaks found in the correlation results 209, the determining module 208 determines that the received signal 11 comprises the first type signal and the second type signal in step 316, in which in such a condition, the peak generated according to the second type signal is superimposed on one of the four repetitive peaks generated according to the first type signal in a negative manner and is observed to be lower than the others. Hence, only three peaks are found in the correlation results.

When there are not three peaks found in the correlation results 209, then the determining module 208 determines that other conditions occur in step 317.

It is noted that though the GPS and Galileo signals are used as an example in the above embodiment, the signal receiver and the signal acquisition method of the present disclosure can be applied to other kinds of satellite signals as well.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A signal receiver used in a satellite communication system, wherein the signal receiver comprises:
   a first type code generator for generating a first type code corresponding to a first type signal;
   a second type code generator for generating a second type code corresponding to a second type signal and having a code length N-time longer than that of the first type code;
   a composite code generator for generating a composite code by superimposing N successive first type codes on the second type code;
   a correlation module for correlating the composite code with a received signal; and
   a determining module for determining a type of the received signal according to correlation results of the composite code with the received signal,
   wherein when N repetitive peaks are found in the correlation results, the received signal is determined to comprise the first type signal and when a single peak is found in the correlation results, the received signal is determined to be the second type signal.

2. The signal receiver of claim 1, further comprising a code NCO (numerical control oscillator) connected to both the first type code generator and the second type code generator for providing a local oscillation signal having a specific frequency such that the first and the second type code generators can generate the first and the second type codes according to the specific frequency.

3. The signal receiver of claim 1, wherein when N repetitive peaks are found in the correlation results and when a height of one of the N repetitive peaks is larger than the height of the others, the type of the received signal is determined to comprise the first type signal and the second type signal.

4. The signal receiver of claim 1, wherein when N+1 peaks are found in the correlation results, the type of the received signal is determined to comprise the first type signal and the second type signal.

5. The signal receiver of claim 1, wherein when N−1 peaks are found in the correlation results, the type of the received signal is determined to comprise the first type signal and the second type signal.

6. The signal receiver of claim 1, wherein the determining module further accumulates the correlation results generated from a plurality of successive cells of the received signal to verify the type of the received signal.

7. The signal receiver of claim 1, wherein the second type code is generated by shifting and combining a plurality of section codes of an original full code.

8. The signal receiver of claim 1, wherein the first type signal is a GPS signal and the second type signal is a Galileo signal, in which the code length of the first type code is 1 ms and the code length of the second type code is 4 ms.

9. The signal receiver of claim 1, wherein the composite code generator generates the composite code by superimposing the N successive first type codes on the second type code with an equal gain in a signed manner.

10. The signal receiver of claim 1, wherein the composite code generator generates the composite code by superimposing the N successive first type codes on the second type code with different gain in a signed manner.

11. A signal acquisition method performed by a satellite communication system, wherein the signal acquisition method comprises:
    generating a first type code corresponding to a first type signal;
    generating a second type code corresponding to a second type signal and having a code length N-time longer than that of the first type code;
    generating a composite code by superimposing N successive first type codes on the second type code;
    correlating the composite code with a cell of a received signal to generate correlation results; and
    determining a type of the received signal according to the correlation results of the composite code with the received signal,
    wherein when N repetitive peaks are found in the correlation results, the received signal is determined to comprise the first type signal and when a single peak is found in the correlation results, the received signal is determined to be the second type signal.

12. The signal acquisition method of claim 11, further comprising a code NCO (numerical control oscillator) connected to both the first type code generator and the second type code generator for providing a local oscillation signal having a specific frequency such that the first and the second type code generators can generate the first and the second type codes according to the specific frequency.

13. The signal acquisition method of claim 11, wherein when N repetitive peaks are found in the correlation results and when a height of one of the N repetitive peaks is larger than the height of the others, the type of the received signal is determined to comprise the first type signal and the second type signal.

14. The signal acquisition method of claim 11, wherein when N+1 peaks are found in the correlation results, the type of the received signal is determined to comprise the first type signal and the second type signal.

15. The signal acquisition method of claim 11, wherein when N−1 are found in the correlation results, the type of the received signal is determined to comprise the first type signal and the second type signal.

16. The signal acquisition method of claim 11, wherein step of determining the type of the received signal further comprises accumulating the correlation results generated from a plurality of successive cells of the received signal to verify the type of the received signal.

17. The signal acquisition method of claim 11, wherein the step of generating the second type code further comprises shifting and combining a plurality of section codes of an original full code.

18. The signal acquisition method of claim 11, wherein the composite code is generated by superimposing the N successive first type codes on the second type code with an equal gain in a signed manner.

19. The signal acquisition method of claim 11, wherein the composite code is generated by superimposing the N successive first type codes on the second type code with different gain in a signed manner.

20. A portable computer used in a wireless communication system, wherein the portable computer comprises:
- an antenna for receiving a received signal; and
- a communication module comprising:
  - a first type code generator for generating a first type code corresponding to a first type signal;
  - a second type code generator for generating a second type code corresponding to a second type signal and having a code length N-time longer than that of the first type code;
  - a composite code generator for generating a composite code by superimposing N successive first type codes on the second type code;
  - a correlation module for correlating the composite code with a received signal; and
  - a determining module for determining a type of the received signal according to correlation results of the composite code with the received signal,
- wherein when N repetitive peaks are found in the correlation results, the received signal is determined to comprise the first type signal and when a single peak is found in the correlation results, the received signal is determined to be the second type signal.

* * * * *